United States Patent
Choi et al.

(10) Patent No.: US 9,077,016 B2
(45) Date of Patent: Jul. 7, 2015

(54) ANION EXCHANGE COMPOSITE MEMBRANE FILLED WITH CROSSLINKED POLYMER ELECTROLYTES FOR FUEL CELLS AND METHOD FOR PREPARING THE SAME

(75) Inventors: Young Woo Choi, Cheongju-si (KR); Mi Soon Lee, Daejeon (KR); Tae Hyun Yang, Daejeon (KR); Chang Soo Kim, Incheon (KR); Young Gi Yoon, Daejeon (KR); Seok Hee Park, Daejeon (KR); Sung Dae Yim, Daejeon (KR); Gu Gon Park, Daejeon (KR); Young Jun Sohn, Daejeon (KR); Minjin Kim, Daejeon (KR); Byungchan Bae, Seoul (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 509 days.

(21) Appl. No.: 13/588,123

(22) Filed: Aug. 17, 2012

(65) Prior Publication Data

US 2013/0288157 A1    Oct. 31, 2013

(30) Foreign Application Priority Data

Apr. 25, 2012    (KR) .................. 10-2012-0043042

(51) Int. Cl.
*H01M 8/10*    (2006.01)
(52) U.S. Cl.
CPC ............ *H01M 8/1062* (2013.01); *Y02E 60/523* (2013.01); *H01M 8/1023* (2013.01)

(58) Field of Classification Search
CPC .................................. H01M 8/10; Y02E 60/52
USPC ...................... 521/25; 429/492; 427/115, 508
See application file for complete search history.

(56) References Cited

PUBLICATIONS

Zhang et al. "Preparation of the crosslinked polymer electrolyte membranes based on a hyperbranched poly(amidoamine) and their proton conductivity", School of Chemistry and Chemical Engineering, State Key Laboratory of Metal Matrix Composites, Shanghai Jiao Tong University, Shanghai, 200240, Peop. Rep. China, e-Polymers (2010).*

* cited by examiner

*Primary Examiner* — Michael M Bernshteyn
(74) *Attorney, Agent, or Firm* — KED & Associates, LLP

(57) ABSTRACT

An anion exchange composite membrane is filled with crosslinked polymer electrolytes for fuel cells. A method comprises, (A) preparing anion exchange electrolyte precursor solution, said anion exchange electrolyte precursor solution consisting of a electrolyte monomer of tetravalent ammonium salt having a cation, a bisacrylamide crosslinker having tertiary amine functional group, an initiator and water; (B) impregnating a porous polymer supporter into said electrolyte precursor solution; (C) forming primary anion exchange crosslink polymer electrolyte micropore filling membrane by laminating said polymer supporter and crosslinking within a film; (D) deriving quanternary ammonium of said crosslinker having tertiary amine functional group by immersing said primary anion exchange crosslink polymer electrolyte micropore filling membrane in Vinylbenzyl chloride monomer solution; and (E) preparing composite membrane filled with crosslinked polymer electrolytes by crosslinking after said ammonium deriving is complete, said crosslinking being radical polymerizing vinyl group of said electrolyte micropore filling membrane.

6 Claims, No Drawings

ANION EXCHANGE COMPOSITE MEMBRANE FILLED WITH CROSSLINKED POLYMER ELECTROLYTES FOR FUEL CELLS AND METHOD FOR PREPARING THE SAME

CROSS-REFERENCE TO RELATED APPLICATION

This application claims the benefit of Korean Patent Application No. 10-2012-0043042 filed on Apr. 25, 2012, which is herein incorporated by reference as if fully set forth herein.

BACKGROUND OF THE INVENTION

The present disclosure generally relates to an anion exchange composite membrane filled with crosslinked polymer electrolytes for fuel cells and method for preparing the same, and more particularly, to a technique for preparing an anion exchange composite membrane filled with crosslinked polymer electrolytes having high ion exchange capacity and hydroxyl ion conductivity in spite of using a small content of electrolyte monomers.

The fuel cells are provided with fuel and air to generate electrical energy. There are some advantages in the fuel cells in that they have high efficiency and generate low environmental pollutants such as exhaust emissions when used. Moreover, a limited quantity of energy is charged in conventional primary cells and secondary cells charge and then it is discharged, whereas the fuel cells are continuously provided with fuel, so the generation is maintaining. Therefore, Many studies on the fuel cells have been performed as a next generation clean energy.

An ion exchange membrane is a type of plastic membrane for separation, which can separate an anion or a cation selectively depending on an ion exchangeable group introduced in the membrane. In a cation exchange membrane being used commercially, the ion exchangeable group is largely divided into a sulfonic acid group (—SO3-) and a carboxylic acid group (—COO—). The former is strong acid and the latter is weak acid. On the other hand, in an anion exchange membrane, the ion exchangeable group is mainly a quanternary ammonium group (—N+R3) which is strong alkali.

This ion exchange membrane is used in electrolysis for desalinizing and refining, water-splitting electrolysis, diffusion dialysis extracting acid from acid waste liquor, and electrodeionization for producing de-ionized water etc. Moreover, after a recent report that there is a probability of using an anion exchange membrane in fuel cells, studies on using an anion exchange membrane in fuel cells are on the increase.

The fuel cells have an anode and a cathode. The former can be provided with hydrogen ions and electrons from hydrogen and methanol, whereas the latter can be provided with oxygen. The principle of generating electricity from fuel cells is as below. That is, when fuel is provided through the anode, it is divided into hydrogen ions and electrons, and then the hydrogen ions are combined with oxygen provided from the cathode through an electrolyte membrane, and then the electrons separated from the fuel of the anode pass through an external circuit. As a result, electric currents are generated, and an electrochemistry reaction, i.e. an inverse reaction of electrolysis of water progresses to generate electricity, heat and water. This types of fuel cells are, for example, polymer electrolyte membrane fuel cell (PEMFC), direct methanol fuel cell (DMFC), direct borohydride fuel cell (DBFC) and solid alkaline fuel cell (SAFC) etc. The PEMFC, DMFC and DBFC of the fuel cells employ a cation exchange membrane that is cation or hydrogen ion conductive electrolyte membrane as a electrolyte membrane, whereas the SAFC or the DBFC of the fuel cells employs an anion exchange membrane that is hydroxyl ion conductive electrolyte membrane as a electrolyte membrane. Here, the DBFC can employ both the cation exchange membrane and the anion exchange membrane.

Thus, when compared with the electrolyte cells employing the cation exchange membrane, the electrolyte cells employing the anion exchange membrane has a characteristic to be able to use catalysts of non-noble metals or non-platinum in an electrode, thereby being lower cost. Therefore, studies on preparing the anion exchange membrane in order to develop this fuel cells employing the anion exchange membrane are gradually on the increase.

KR Patent Application No. 1982-0005057 discloses an anion exchange membrane, wherein 10~90% of anion exchange groups of homogeneous type anion exchange membrane is crosslinked by chain-like aliphatic series of 3~10 carbons between bonding. The present inventors have developed and applied a method for preparing a polymer electrolyte composite membrane crosslinked by a water-soluble monomer (KR Patent Application No. 10-2008-0110985). However, the above application discloses a cation exchange membrane, and a method for preparing an acrylate monomer-acrylamide crosslinked polymer electrolyte composite membrane having a sulfonic acid group, the polymer electrolyte composite membrane being prepared by impregnating a microporous polymer supporter membrane in mixed solution, the mixed solution containing acrylate monomers having the sulfonic acid group, a bisacrylamid crosslinker and a photo initiator, and then crosslinking with heat or photo.

Therefore, the present inventors have continuously studied on preparing an anion exchange polymer electrolyte composite membrane representing high ion exchange capacity while using a small content of electrolyte monomer, and resulted in completing the present disclosure.

SUMMARY OF THE INVENTION

The present disclosure provides a method for preparing effectively an anion exchange composite membrane filled with crosslinked polymer electrolytes having high ion exchange capacity and hydroxyl ion conductivity using a simple preparing process.

The present disclosure also provides an anion exchange composite membrane filled with crosslinked polymer electrolytes having high ion exchange capacity and hydroxyl ion conductivity.

According to an aspect of the present disclosure, a method for preparing an anion exchange composite membrane filled with crosslinked polymer electrolytes is provided, the method comprising: (A) preparing anion exchange electrolyte precursor solution, said anion exchange electrolyte precursor solution consisting of a electrolyte monomer of tetravalent ammonium salt having a cation, a bisacrylamide crosslinker having tertiary amine functional group, an initiator and water; (B) impregnating a porous polymer supporter into said electrolyte precursor solution; (C) forming a primary anion exchange membrane filled with crosslinked polymer electrolytes micropore by laminating said polymer supporter and crosslinking within a film; (D) deriving quanternary ammonium of said crosslinker having a tertiary amine functional group by immersing said primary anion exchange membrane filled with crosslinked polymer electrolytes micropore in Vinylbenzyl chloride monomer solution; and (E) after said ammonium deriving is completed, preparing composite membrane filled with crosslinked polymer electrolytes by crosslinking said crosslinking being radical polymerizing vinyl group of said electrolyte micropore filling membrane.

Advantageously, said electrolyte monomer of tetravalent ammonium salt having a cation may be vinylbenzyl trimethylammonium chloride. Advantageously, said bisacrylamide crosslinker having tertiary amine functional group may be N,N'-bisacryloylpiperazine. Advantageously, said anion exchange electrolyte precursor solution may be prepared by adding 0.5~2 part by weight of said initiator to 100 part by weight of a mixed solution, said mixed solution being mixed with 48~86 part by weight of said electrolyte monomer of tetravalent ammonium salt, 2~4 part by weight of said bisacrylamide crosslinker having tertiary amine functional group and 10~50 part by weight. Advantageously, said porous polymer supporter is polyolefin based porous supporter, said polyolefin based porous supporter being porous hydrocarbon membrane, wherein the volume of pores of said porous hydrocarbon membrane is 30~60%, the size of pores of said porous hydrocarbon membrane is 0.05~0.1 um and the thickness of said porous hydrocarbon membrane is 20~55 um.

Advantageously, said crosslinking of said steps (C) and (E) may be photoactivated crosslinking, wherein Ultra Violet may be radiated in said photoactivated crosslinking, wherein the energy of said Ultra Violet is 30~150 mJ/cm3.

According to another aspect of the present disclosure, An anion exchange composite membrane filled with crosslinked polymer electrolytes prepared according to one of the above method.

According to the present disclosure, an initiator conventionally used in preparing a composite membrane filled with polymer electrolytes is used as an electrolyte while using a simple preparing process, therefore, there are advantages that excellent ion exchange capacity and hydroxyl ion conductivity can be obtained while the amount of electrolyte monomers used is the same as that of conventional process. Moreover, the anion exchange composite membrane filled with crosslinked polymer electrolytes prepared by the above method has an excellent hydroxyl ion conductivity at room temperature, so it can be widely used in industry field of fuel cells including solid alkaline fuel cell etc.

DETAILED DESCRIPTION OF THE INVENTION

In the following description, the present disclosure is described in detail.

According to an embodiment of the present disclosure, a method for preparing an anion exchange composite membrane filled with crosslinked polymer electrolytes, the method comprising: (A) preparing anion exchange electrolyte precursor solution, said anion exchange electrolyte precursor solution consisting of a electrolyte monomer of tetravalent ammonium salt having a cation, a bisacrylamide crosslinker having tertiary amine functional group, an initiator and water; (B) impregnating a porous polymer supporter into said electrolyte precursor solution; (C) forming a primary anion exchange membrane filled with crosslinked polymer electrolytes micropore by laminating said polymer supporter and crosslinking within a film; (D) deriving quanternary ammonium of said crosslinker having tertiary amine functional group by immersing said primary anion exchange membrane filled with crosslinked polymer electrolytes micropore in Vinylbenzyl chloride monomer solution; and (E) preparing composite membrane filled with crosslinked polymer electrolytes by crosslinking after said ammonium deriving is complete, said crosslinking being radical polymerizing vinyl group of said electrolyte micropore filling membrane.

Advantageously, in the step (A), the electrolyte monomer of tetravalent ammonium salt of the electrolyte precursor solution may be Vinylbenzyl trimethylammonium chloride, wherein the Vinylbenzyl trimethylammonium chloride is represented by the following formula I as below (but not limited to this).

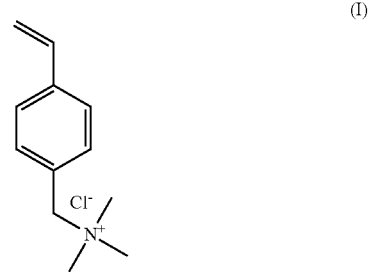

(I)

The bisacrylamide crosslinker having a tertiary amine functional group may be N,N'-bisacryloylpiperazine, wherein the N,N'-bisacryloylpiperazine is represented by the following formula II as below (but not limited to this). Anything may be used as long as it has a tertiary amine functional group.

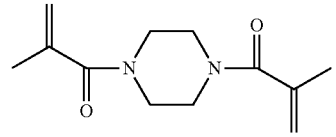

(II)

Advantageously, the anion exchange electrolyte precursor solution may be prepared by adding 0.5~2 part by weight of said initiator to 100 part by weight of a mixed solution, said mixed solution being mixed with 48~86 part by weight of said electrolyte monomer of tetravalent ammonium salt, 2~4 part by weight of said bisacrylamide crosslinker having tertiary amine functional group and 10~50 part by weight.

Advantageously, the initiator may be a photo initiator, but is not limited to this. Advantageously, the initiator may be 2-Hydroxy-2-Methy-1-Phenylpropane-1-one.

Moreover, in the step (B), the porous polymer supporter may be porous hydrocarbon membrane, wherein the volume of pores of said porous hydrocarbon membrane is 30~60%, the size of pores of said porous hydrocarbon membrane is 0.05~0.1 um and the thickness of said porous hydrocarbon membrane is 20~55 um. If properties of the porous polymer supporter are beyond the above range, the membrane is not prepared desirably, and result in performance degradation when applied in fuel cells.

Advantageously, in the steps (C) and (E), the porous polymer support may be also laminated up and down between polyethylene terephthalate (PET) film. Advantageously, in the above steps, the crosslinking reaction may be also photoactivated crosslinking, wherein Ultra Violet is radiated in said photoactivated crosslinking, wherein advantageously, the energy of said Ultra Violet is 30~150 mJ/cm3.

In the following description, the preparing method is described in detail step by step.

First, anion exchange electrolyte precursor solution is prepared, said anion exchange electrolyte precursor solution consisting of a electrolyte monomer of tetravalent ammonium salt having a cation, a bisacrylamide crosslinker having tertiary amine functional group, an initiator and water. According to an embodiment of the present disclosure, the electrolyte monomer of tetravalent ammonium salt is vinylbenzyl trimethylammonium chloride, and the bisacrylamide crosslinker having tertiary amine functional group is N,N'-bisacryloylpiperazine. The vinylbenzyl trimethylammonium chloride, and the N,N'-bisacryloylpiperazine, and the de-ionized water are mixed with 48~86 part by weight, 2~4 part by weight and 10~50 part by weight respectively. Then 0.5~2 part by weight of the initiator, i.e. photo initiator, 2-Hydroxy-2-Methy-1-Phenylpropane-1-one is mixed to the mixed solution 100 part by weight to prepare anion exchange electrolyte precursor solution.

Next, a porous polymer supporter is impregnated into said electrolyte precursor solution. Here, the porous polymer supporter is polyolefin based porous supporter, said polyolefin based porous supporter being porous hydrocarbon membrane, wherein the volume of pores of said porous hydrocarbon membrane is 30~60%, the size of pores of said porous hydrocarbon membrane is 0.05~0.1 um and the thickness of said porous hydrocarbon membrane is 20~55 um.

Next, the primary anion exchange membrane filled with crosslinked polymer electrolytes micropore is formed by laminating said polymer supporter and crosslinking within a film. Particularly, the membrane impregnated into the electrolyte precursor solution is put between polyethylelenteraphthalate (PET) film, and then Ultra Violet of 30~150 mJ/cm2 energy is radiated and crosslinked (see the following formula III). After the above crosslinking, the PET film is removed, and by-product on the surface of the composite membrane is removed to enable the surface to become uniform, and then is cleaned with de-ionized water several times to prepare primary basic polymer composite membrane.

(III)

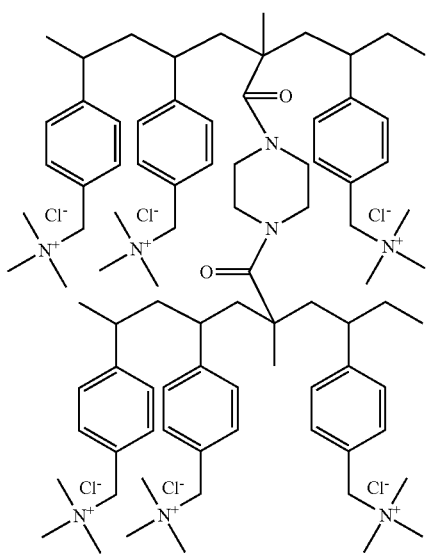

The structure of the formula III is simply represented the following formula IV.

(IV)

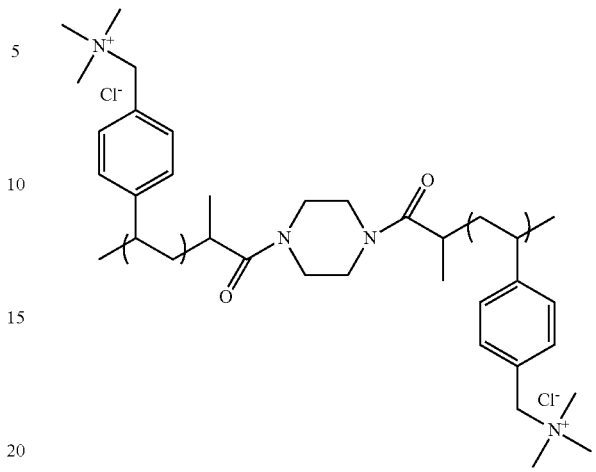

In addition, the following reaction is processed in order to maximize ion exchange capacity and hydroxyl ion conductivity for the primary reaction completed membrane. In other words, the primary reaction completed membrane is immersed into solution containing more than 90% of Vinylbenzyl chloride monomer of the structure such as the following formula V. In order to derive the tertiary amine of N,N'-bisacryloylpiperazine used as the crosslinker to react with the Vinylbenzyl chloride and to derive quanternary ammonium reaction, the reaction progresses for 12 hours while maintaining the temperature of 25~30° C.

(V)

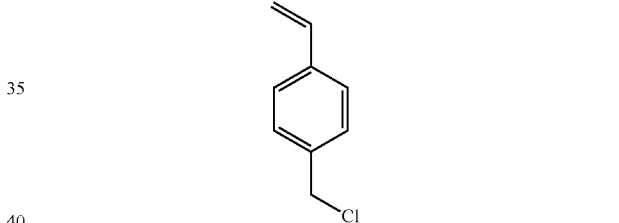

When the quanternary ammonium reaction is completed, the membrane has the following structure (formula VI), the reaction completed membrane is separated from the Vinylbenzyl chloride monomer, and then the membrane is cleaned several times with methanol, so a residual non-reacted Vinylbenzyl chloride monomer within the membrane is removed completely.

(VI)

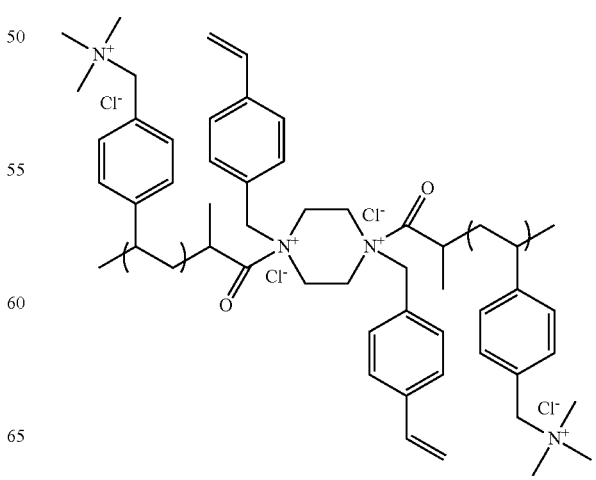

The quanternary ammonium reaction completed membrane has Vinyl group, so a polymerization reaction progresses through radical polymerization for this. The photo initiator used as an initiator, i.e. 2-Hydroxy-2-Methy-1-Phenylpropane-1-one is diluted with 10 weight % of methanol, and the quanternary ammonium reaction completed membrane is immersed into the diluted solution, it is swelled in order to derive the photo initiator to permeate into the membrane, and then the supporter is put between polyethylenterephthalate (PET) film, and then Ultra Violet of 30~150 mJ/cm$^2$ energy is radiated to crosslink it, and as a result, the composite membrane filled with crosslinked polymer electrolytes of the structure is prepared. The composite membrane is, for example, the following formula VII.

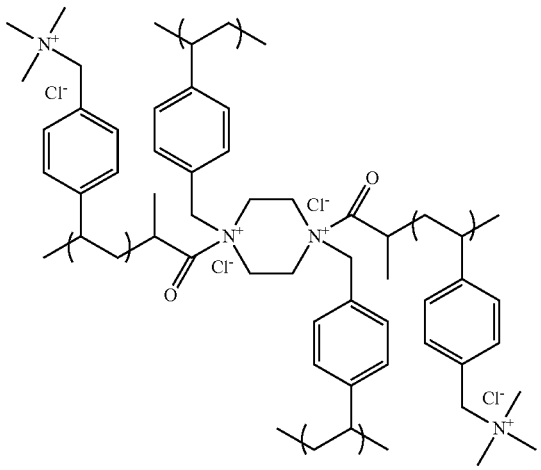

(VII)

Next, after the radical polarization process, the PET film is removed and by-product on the surface of the composite membrane is removed to cause the surface to become uniform, and then cleaned several times with de-ionized water to prepare the polymer composite membrane. If OH$^-$ ion is substituted for Cl$^-$ ion by immersing the polymer composite membrane into 2N sodium hydroxide solution, hydroxyl ion conductivity can be obtained desirably.

The polymer composite membrane prepared by the above method can obtain excellent ion exchange capacity and hydroxyl ion conductivity as compared with conventional polymer composite membrane, since there are tertiary ammonium groups in the structure of the crosslinker, i.e. N,N' bisacryloylpiperazine, and the composite membrane is prepared by deriving the tertiary ammonium groups into quanternary ammonium, and N,N'-bisacryloylpiperazine used as the crosslinker serves as the electrolyte as well.

EXAMPLES

In the following description, the present disclosure is described with the examples in more detail.

But, the following examples is only intended to illustrate the present disclosure, the scope of the present disclosure is not limited to the following examples.

Example 1

Preparation of High Conductive Anion Crosslinked Polymer Electrolytes Composite Membrane In order to preparing conductive anion crosslinked polymer electrolytes composite membrane, mixed and stirred (Vinylbenzyl)trimethylammonium chloride, N,N'-bisacryloylpiperizine, de-ionized water at a weight % of 61.5:15.4: 23.1, and then mixed 10 weight % of diluted 2-Hydroxy-2-Methy-1-Phenylpropane-1-one (Darocure 1173) in methanol with a photo initiator for the 100 weight % of the mixed solution at 1 weight %.

Subsequently, impregnated polyolefin based porous supporter into the above solution, the porous supporter being membrane thickness 25 um, average pore size 0.07 um, pore distribution 45%, and enabled monomer solution to permeate into the supporter, and then, put the electrolyte impregnated membrane between polyethylelenterephthalate (PET) film, and radiated Ultra Violet of 30~150 mJ/cm$^2$ energy. After the crosslinking process, removed the PET film, and removed by-product on the surface of the composite membrane to enable the surface become uniform, and then cleaned with de-ionized water several times to prepare primary basis polymer composite membrane.

In order to maximize ion exchange capacity and hydroxyl ion conductivity for the primary reaction completed membrane, the reaction as below more progressed. In other words, immersed the primary reaction completed membrane into a solution containing more than 90% of Vinylbenzyl chloride monomer the structure as below, and in order to derive tertiary amine of N,N'-bisacryloylpiperizine used the crosslinker to react with Vinylbenzyl chloride to become quanternary ammonium, reacted for 12 hours while maintaining 25~30° C.

After separating the quanternary ammonium reaction completed membrane from the monomer solution, cleaned the membrane with methanol several times to remove residual non-reaction Vinylbenzyl chloride monomer within the membrane completely.

The quanternary ammonium reaction completed membrane has Vinyl group. Therefore in order to progress a polymerization reaction through radical polymerization for this, Darocure 1173 as a photo initiator is diluted in 10 weight % of methanol, and immersed the quanternary ammonium reaction completed membrane into the diluted solution and swelled to derive the photo initiator to permeate into the membrane, and then put the supporter between polyethylelenterephthalate (PET) film, and then radiated Ultra Violet of 30~150 mJ/cm$^2$ energy to prepare composite membrane filled with crosslinked polymer electrolytes. After the above radical polarization process, removed the PET film, and removed by-product on the surface of the composite membrane to enable the membrane to become uniform, and then cleaned with de-ionized water several times to prepare the polymer composite membrane.

Example 2

Preparation of High Conductive Anion Crosslinked Polymer Electrolyte Composite Membrane The same process as the example 1 except for becoming (Vinylbenzyl)trimethylammonium chloride, N,N'-bisacryloylpiperizine, de-ionized water at the weight % of 70.6:5.9: 23.5 progressed to prepare the high conductive anion crosslinked polymer electrolyte composite membrane.

Comparison Example 1

Preparation of Conductive Anion Crosslinked Polymer Electrolytes Composite Membrane As a first comparison membrane, in order to preparing conductive anion crosslinked polymer electrolytes composite membrane, mixed and stirred (Vinylbenzyl)trimethyl ammonium chloride, N,N'-bisacryloylpiperizine, de-ionized water at a weight % of 61.5:15.4:23.1, and then mixed 10 weight % of diluted Darocure 1173 in methanol with a photo initiator for the 100 weight % of the mixed solution at 1 weight %.

Subsequently, impregnanted polyolefin based porous supporter into the above solution, the porous supporter being membrane thickness 25 um, average pore size 0.07 um, pore distribution 45%, and enabled monomer solution to permeate into the supporter, and then put the electrolyte impregnanted membrane between polyethylelenterephthalate (PET) film, and radiated Ultra Violet of 30~150 mJ/cm² energy. After the crosslinking process, removed the PET film, and removed by-product on the surface of the composite membrane to enable the surface become uniform, and then cleaned with de-ionized water several times to prepare primary basis polymer composite membrane.

Comparison Example 2

Preparation of Conductive Anion Crosslinked Polymer Electrolytes Composite Membrane In order to preparing conductive anion crosslinked polymer electrolytes composite membrane as a second comparison membrane, the same process as the example 1 except for becoming (Vinylbenzyl)trimethylammonium chloride, N,N'-bisacryloylpiperizine, de-ionized water at the weight % of 70.6:5.9:23.5 progressed to prepare the high conductive anion crosslinked polymer electrolyte composite membrane.

Test Example 1

Test for Tensile Strength

Measured the tensile strength (kpsi) of the electrolyte membrane prepared in the above examples and comparison examples according to a method described in ASTM 882.

Test Example 2

Measurement of Hydroxyl Ion Conductivity

Immersed the electrolyte membrane prepared in the above examples and comparison examples into distilled water of 25° C. for 1 hour, and then put rectangle platinum electrode without removing water on the surface of the membrane with two sheets of fixed glass substrate and fixed the two sheets of glass, and then measured alternating current impedance 100 Hz~4 MHz to measure the hydroxyl ion conductivity of the membrane.

Test Example 3

Measurement of Ion Exchange Capacity

Immersed the electrolyte membrane prepared in the above examples and comparison examples into 2N aqueous sodium hydroxide solution for 24 hours and substituted OH⁻ ion for Cl⁻ ion, and then cleaned with de-ionized water several times to obtain enough hydroxyl ion conductivity, and then immersed them into 3M aqueous sodium chloride solution for 24 hours in turn, and substituted OH⁻ ion from the membrane, and titrated 0.01N hydrogen chloride in aqueous sodium chloride solution being in predetermined equivalent of sodium hydroxyl with a potentiometric titrator.

Results of the above test examples are represented as table 1.

TABLE 1

|  | Example 1 | Comparison example 1 | Example 2 | Comparison example 2 |
|---|---|---|---|---|
| Tensile strength (MD/Td, kpsi) | 23/20 | 23/20 | 23/20 | 23/20 |
| Hydroxyl ion conductivity (S/cm) | 0.043 | 0.033 | 0.045 | 0.025 |
| Ion exchange capacity (meq/g) | 1.87 | 1.60 | 1.92 | 1.35 |

MD: machine direction
TD: transverse direction

As can be seen in the above table 1, the electrolyte composite membrane of the examples 1, 2 of the present disclosure that use the initiator as the electrolyte represent excellent hydroxyl ion conductivity and ion exchange capacity as compared with comparison examples 1, 2.

Furthermore, the electrolyte composite membrane of the present disclosure has an excellent and stabile tensile strength and is verified as probability of mass production by continuous preparing process. Therefore, when system for production is structured, it can be widely exploited as membranes for low cost and environment-friendly hydrocarbon fuel cells.

What is claimed is:

1. A method for preparing anion exchange composite membrane filled with crosslinked polymer electrolytes, the method comprising:
   (A) preparing anion exchange electrolyte precursor solution, said anion exchange electrolyte precursor solution consisting of a electrolyte monomer of tetravalent ammonium salt having a cation, a bisacrylamide crosslinker having tertiary amine functional group, an initiator and water;
   (B) impregnating a porous polymer supporter into said electrolyte precursor solution;
   (C) forming a primary anion exchange membrane filled with crosslinked polymer electrolytes micropore by laminating said polymer supporter and crosslinking within a film;
   (D) deriving quanternary ammonium of said crosslinker having tertiary amine functional group by immersing said primary anion exchange membrane filled with crosslinked polymer electrolytes micropore in Vinylbenzyl chloride monomer solution; and
   (E) after said ammonium deriving is completed, preparing composite membrane filled with crosslinked polymer electrolytes by crosslinking, said crosslinking being radical polymerizing vinyl group of said electrolyte micropore filling membrane.

2. The method of claim 1, wherein said electrolyte monomer of tetravalent ammonium salt having a cation is vinylbenzyl trimethylammonium chloride.

3. The method of claim 1, wherein said bisacrylamide crosslinker having tertiary amine functional group is N,N'-bisacryloylpiperazine.

4. The method of claim 1, wherein said anion exchange electrolyte precursor solution is prepared by adding 0.5~2 part by weight of said initiator to 100 part by weight of a mixed solution, said mixed solution being mixed with 48~86 part by weight of said electrolyte monomer of tetravalent ammonium salt, 2~4 part by weight of said bisacrylamide crosslinker having tertiary amine functional group and 10~50 part by weight.

5. The method of claim 1, wherein said porous polymer supporter is polyolefin based porous supporter, said polyolefin based porous supporter being porous hydrocarbon membrane, wherein the volume of pores of said porous hydrocarbon membrane is 30~60%, the size of pores of said porous hydrocarbon membrane is 0.05~0.1 um and the thickness of said porous hydrocarbon membrane is 20~55 um.

6. The method of claim 1, wherein said crosslinking of said steps (C) and (E) are photoactivated crosslinking, wherein Ultra Violet is radiated in said photoactivated crosslinking, wherein the energy of said Ultra Violet is 30~150 mJ/cm$^3$.

\* \* \* \* \*